US011572243B2

(12) United States Patent
Lo et al.

(10) Patent No.: US 11,572,243 B2
(45) Date of Patent: Feb. 7, 2023

(54) MEDIA SENSORS

(71) Applicant: Hewlett-Packard Development Company, L.P., Spring, TX (US)

(72) Inventors: Kevin Lo, Vancouver, WA (US); Jody L Clayburn, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 235 days.

(21) Appl. No.: 16/958,210

(22) PCT Filed: Jan. 25, 2018

(86) PCT No.: PCT/US2018/015292
§ 371 (c)(1),
(2) Date: Jun. 26, 2020

(87) PCT Pub. No.: WO2019/147250
PCT Pub. Date: Aug. 1, 2019

(65) Prior Publication Data
US 2020/0361201 A1    Nov. 19, 2020

(51) Int. Cl.
*B65H 7/14*       (2006.01)
*B41F 33/14*      (2006.01)
*G01J 1/42*       (2006.01)
*B41J 11/00*      (2006.01)

(52) U.S. Cl.
CPC ............... *B65H 7/14* (2013.01); *B41F 33/14* (2013.01); *G01J 1/4204* (2013.01); *B41J 11/002* (2013.01); *B65H 2402/44* (2013.01); *B65H 2511/51* (2013.01)

(58) Field of Classification Search
CPC ... B65H 7/04; B65H 7/06; B65H 7/14; B65H 7/20; B65H 43/02; B65H 43/04; B65H 43/08; B65H 2402/44; B65H 2402/441; B65H 2511/51; B65H 2511/515; B65H 2511/528; B65H 2553/40; B65H 2553/41; B65H 2553/412; B65H 2553/81; B65H 2553/82; B65H 2601/11; B41F 33/14;
(Continued)

(56) References Cited

U.S. PATENT DOCUMENTS 4,085,928 A * 4/1978 Sussman ................ B65H 7/14
                                                     250/227.21
5,280,322 A   1/1994 Kono
5,615,876 A   4/1997 Yergenson et al.
(Continued)

FOREIGN PATENT DOCUMENTS

JP    2000289358 A    10/2000
JP    2002086690 A     3/2002
JP    2008229874 A    10/2008

*Primary Examiner* — Prasad V Gokhale
(74) *Attorney, Agent, or Firm* — Brooks, Cameron & Huebsch, PLLC

(57) ABSTRACT

An example a media sensor device may comprise a light source positioned on a first side of a media pathway, a light path to receive a light from the light source and direct the light through a plurality of openings from the first side of the media pathway to a second side of the media pathway, and a light sensor on the second side of the media pathway to detect print media within the light path based on an intensity of light received from the light source, wherein a heated enclosure aligns the light sensor with the light path.

15 Claims, 4 Drawing Sheets

(58) Field of Classification Search
CPC ... G01J 1/4204; G03G 15/70; G03G 21/1638; G03G 2215/00341; G03G 2215/00548
See application file for complete search history.

(56) References Cited

U.S. PATENT DOCUMENTS

| | | |
|---|---|---|
| 7,092,646 B2 | 8/2006 | Schroath et al. |
| 7,986,420 B2 | 7/2011 | Harris |
| 9,188,946 B2 | 11/2015 | Nishikawa et al. |
| 2005/0151771 A1 | 7/2005 | Weast et al. |
| 2006/0233558 A1 | 10/2006 | Son |
| 2008/0187328 A1 | 8/2008 | Schoedinger et al. |
| 2010/0086318 A1* | 4/2010 | Nishino ............. G03G 21/1638 399/21 |
| 2012/0001386 A1* | 1/2012 | Nishikata ................ B65H 7/14 271/265.01 |
| 2013/0043415 A1* | 2/2013 | Misao ................ G03G 15/6567 250/559.15 |
| 2013/0264770 A1* | 10/2013 | Zheng ................ G01B 11/028 271/265.01 |
| 2015/0301491 A1 | 10/2015 | Yoshikawa et al. |

\* cited by examiner

MEDIA SENSORS

BACKGROUND

Printing systems, such as printers, copiers, etc., may generate text or images onto print media (e.g., paper, plastic, etc.). In some examples, printing systems may include a media pathway to transition print media inside the printing system. Printing systems, may include media sensors to detect the location of print media while in the media pathway.

DETAILED DESCRIPTION

Figure 1:
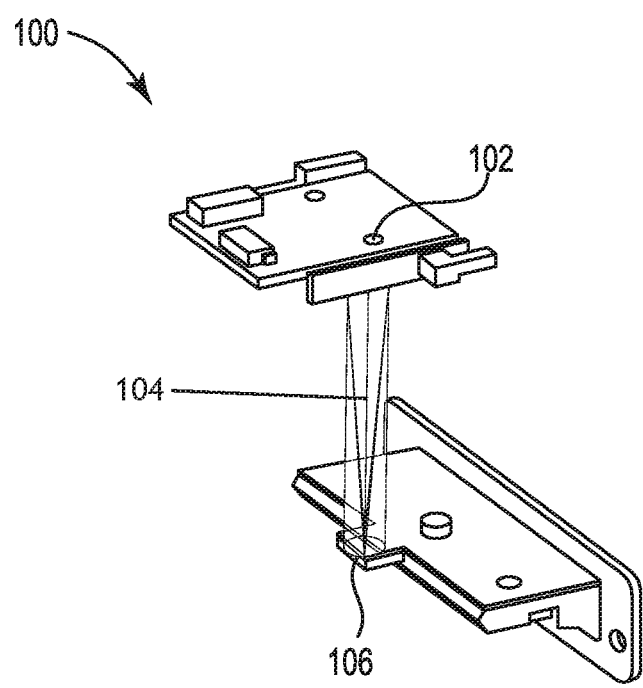
FIG. 1 illustrates an example media sensor.

Media sensors and systems are described herein. In some examples, a printing device may include a media sensing device to detect when a media pathway is blocked. In some examples, the media sensor may have a light source to display light through a light path. For example, the light path may direct light to a light sensor. In some examples, the light sensor may detect when print media is blocking the media pathway. For example, the light sensor may detect when print media is blocking the media pathway by determining if print media has crossed the light path within a particular time period. In some examples, the light sensor may detect if print media is lodged in the heat transfer belt of the heated enclosure.

In some examples, the printing device (e.g., inkjet printing device, etc.) may include a heated enclosure (e.g., a heated pressure roller enclosure, etc.). For example, the heated enclosure may be positioned within a printing device to provide a heated media pathway. As described herein, the heated enclosure of the printing device may increase a drying rate of partially dried print media and remove distorted properties of partially dried print media. For example, partially dried print media may have distorted properties such as a curl, a cockle, a reduction in stiffness, increased surface roughness, extruding fibers from the surface, misaligned fibers, and/or increased sheet to sheet friction of the media. In some examples, the increased evaporation of print substance may result in an increase of moisture, steam, and/or vapor within the printing device.

The heated enclosure described herein may be a dual purpose heated enclosure. For example, the same heated enclosure may be utilized to increase drying rate and/or remove distorted properties of partially dried print media. In some examples, the heated enclosure may be utilized to align the light sensor of the printing device with the light path by positioning the light sensor towards the light path and/or positioning the light sensor at a particular distance along the media pathway.

In some examples, a printing device may include a media sensor to detect when a media pathway is blocked. In some examples, the media sensor may include a light sensor to determine if the media pathway is blocked. As used herein, a blocked media pathway refers to print media blocking the media pathway, print media being jammed or lodged in a heated enclosure, a printing device being unable to remove or eject print media, and/or a printing device being unable to function properly until unwanted print media is removed from the media pathway. In some examples, print media may block the portion of the media pathway located near the heated enclosure. In some examples, the printing device may not function properly if the print media blocking the media pathway near the heated enclosure is not removed (e.g., function according to manufacturer specifications, etc.). Accordingly, this disclosure describes systems and methods that allow a media sensing device to determine if print media is blocking the media pathway.

FIG. 1 illustrates an example media sensor 100. The media sensor 100 may be implemented in a variety of imaging systems, such as printers or copiers, for example. In some examples, the media sensor 100 may include a light source 102. In some examples, the light source 102 may be a light emitted diode (LED). However, this disclosure is not so limited. The light source 102 may be a lighting device that is able to display a light. For example, the light source 102 may be a florescent light source, an incandescent light source, etc. As used herein, a light source 102 refers to an electronic device that generates wavelengths in the visible light spectrum (e.g., approximately 390-700 nanometer wavelength spectrum, etc.) and/or in the infrared spectrum (e.g., approximately 700 nm-1 millimeter wavelength spectrum, etc.).

Figure 4:
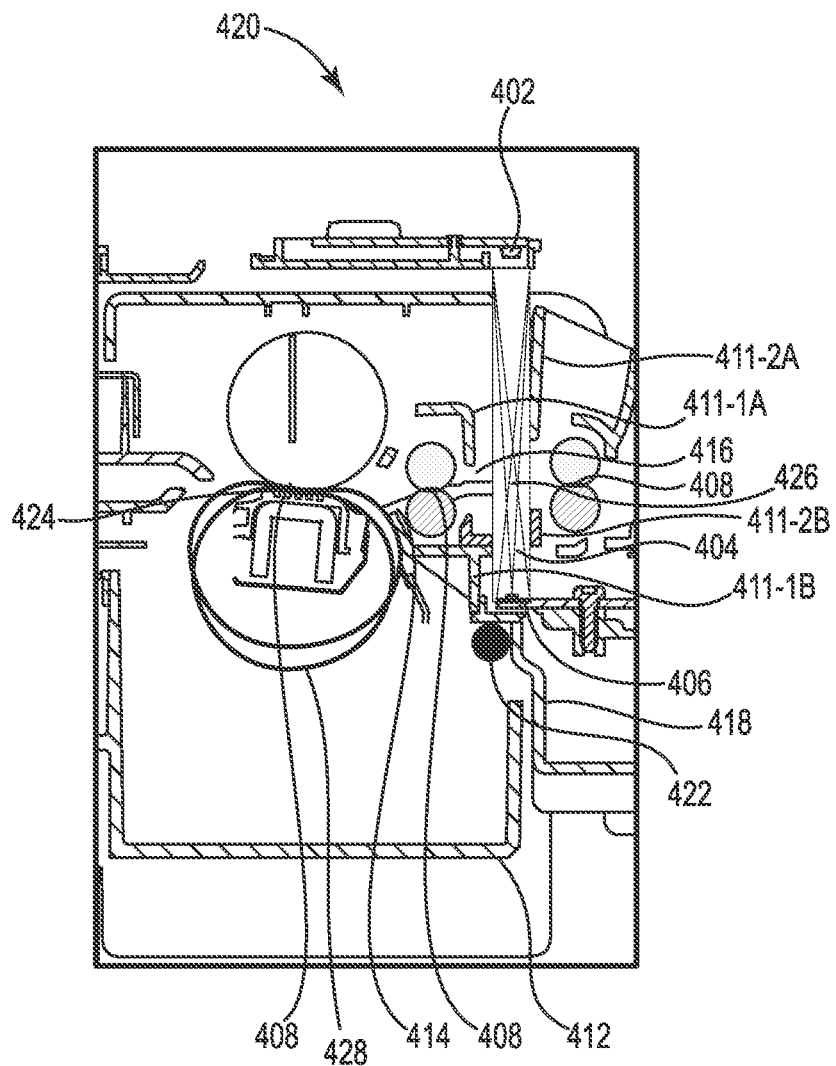
FIG. 4 illustrates an example printing device containing a media sensor.

In some examples, the light source 102 may be located above a light sensor 106, as illustrated in FIG. 1. In some examples, the light source 102 may be located on one side of the media pathway (e.g., media pathway 408 as illustrated in FIG. 4). For example, the light source 102 may be located on a first side (e.g., first side 416 as illustrated in FIG. 4) of the media pathway. In some examples, the light source 102 may be located above a light path 104, as illustrated in FIG. 1.

In some examples, the light source 102 may display a light that illuminates a light path 104. In some examples, the light source 102 may be a constant display of light through a light path 104. For example, the light source 102 may display a continuous light through the light path 104 during the printing process of a printing device. In some examples, the light source 102 may display a continuous pulse of light during the printing process.

In some examples, the light path 104 may be a path that extends from the first side a media pathway to a second side (e.g., second side 414 as illustrated in FIG. 4) of a media pathway. For example, the light path 104 may be a path that extends from the light source 102 across the media pathway to the light sensor 106. In some examples, the light path 104 may comprise air, light guides, and/or combinations thereof. In some examples, the light path 104 may direct light from the light source 102 to the second side of the media pathway.

In some examples, the light sensor 106 may be an ambient light sensor. As used herein, an ambient light sensor refers to a sensor that detects light (e.g., the amount of light received, intensity of light, etc.) and may send a signal to the printing device to stop the printing process (e.g., enter a low or no power state, such as by ceasing to power a print engine) if the media pathway is blocked. In some examples, the light sensor 106 may detect light from a light source 102. For example, when a heated enclosure (e.g., heated enclosure 412 as illustrated in FIG. 4) is inserted into a printing device, the light path 104 may direct light onto the light sensor 106.

In some examples, when a heated enclosure is inserted into a printing device, the heated enclosure may alter position of the light sensor 106 and align the light sensor 106 with the light source 102. In some examples, the light path 104 may be aligned with the light sensor 106. For example, when the heated enclosure is inserted into the printing device, the light source 102 may display a light onto the light sensor 106. In various examples, the light sensor 106 may be connected to the light source 102 by the light path 104.

In some examples, the light sensor 106 may be located below a light source 102, as illustrated in FIG. 1. In some examples, the light sensor 106 may be located on one side of the media pathway. For example, the light sensor 106 may be positioned on the second side of a media pathway. In some examples, the light sensor 106 may be located below a light path 104, as illustrated in FIG. 1.

In some examples, the light sensor 106 may detect when print media crosses the light path 104. In some examples, if print media crosses the light path 104 the light sensor 106 may not receive light from the light source 102. For example, as print media crosses the light path 104 it may block the light source 102 from the light sensor 106, preventing the light sensor 106 from receiving light from the light source 102.

In some examples, the light sensor 106 may detect when print media is blocking the media pathway, by detecting if print media crossed the light path 104. For example, the light sensor 106 may detect the intensity of light received from the light source 102 to determine if print media crossed the light path 104. In various examples, a light source 102 may detect when print media is trapped in a heated enclosure by detecting if print media crossed the light path 104 within a particular time period (e.g., a time consistent with equation 1). For example, if print media crosses the light path 104, the light sensor 106 may not receive light from a light source 102 and the light sensor 106 may determine that the print media is not blocking the media pathway. However, if print media does not cross the light path 104, the light sensor 106 may continue to receive light from a light source 102 and the light sensor 106 may determine that the print media is blocking the media pathway.

Figure 2:
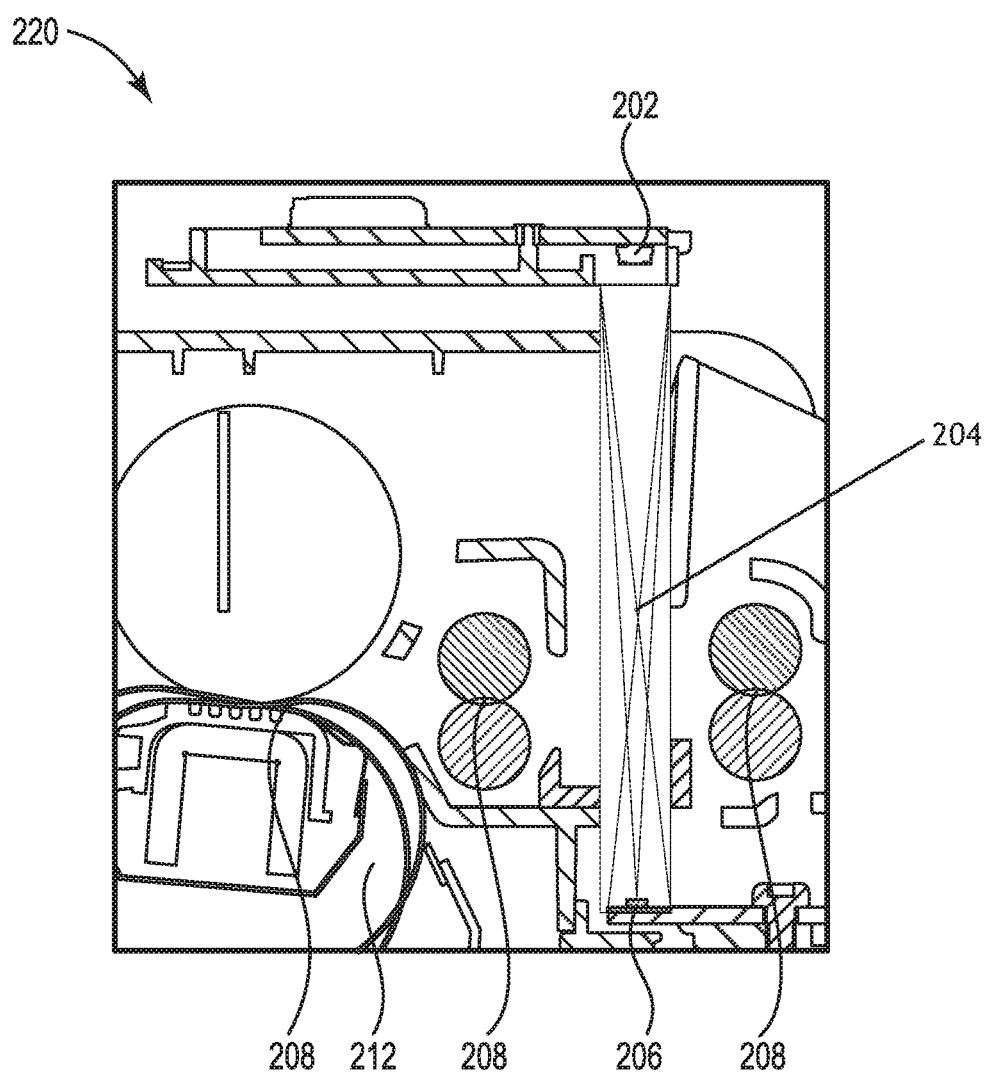
FIG. 2 illustrates an example printing device containing a media sensor.

FIG. 2 illustrates an example printing device 220 containing a media sensor. In some examples, a printing device 220 may include a media sensing device to determine the location of print media. In some examples, the printing device 220 may include a media pathway 208 to transition print media throughout the printing device 220. In some examples, the media pathway 208 may transition print media from a media storage (e.g., media tray, paper tray, etc.) to a print zone. In some examples, the print zone includes an area within a printing device 220 to deposit print substance on a print media. In some examples, the print zone may be coupled to the media storage by a media pathway 208. In some examples, the media pathway 208 may transition print media from the print zone to a heated enclosure and/or to the output zone of the printing device 220.

In some examples, the printing device 220 may include a heated enclosure 212. In some examples, the heated enclosure 212 may be a heated pressure roller enclosure to increase the drying rate of partially dried print media and/or remove distorted properties of the partially dried print media. In some examples, the heated enclosure 212 may include a first roller and a second roller. In some examples, the first roller may be a pressure roller. As used herein, a pressure roller may be utilized to apply pressure to a first side of the partially dried print media. In some examples, the first roller may utilize a contact zone and a corresponding pressure platen of the second roller to apply pressure to the first side of the partially dried print media. In some examples, the second roller may be a heated roller. In some examples, the heated roller may utilize a heat source and/or a heat transfer belt to apply heat to a second side of the partially dried print media. In some examples, the first roller and the second roller may work in combination as a heated pressure roller.

In some examples, the heated enclosure 212 may be a heated dryer enclosure with heated surfaces to increase the drying rate of partially dried print media and/or remove distorted properties of partially dried print media. In some examples, the heated enclosure 212 may be coupled to the media pathway to allow the partially dried print media to dry. In some examples, the heated enclosure 212 may include air circulation, heat sources, and/or other drying elements to increase drying of partially dried print media. In some examples, the heated enclosure 212 may generate temperatures ranging from about 4 degrees Celsius (° C.) above the ambient temperature to about 220° C. As used herein, ambient temperature refers to the air temperature of the environment where the heated enclosure is housed.

In some examples, the media pathway 208 may be connected to a heated enclosure 212. In some examples, portions of the media pathway 208 may be included in the heated enclosure 212, as illustrated in FIG. 2. For example, print media may be transported through the heated enclosure 212 to reach an output zone of the printing device 220. In some examples, the heated enclosure 212 may be a removable heated enclosure 212. For example, the heated enclosure 212 may be removed from the printing device 220 to expel print media blocking the media pathway 208. That is, if print media is lodged in the heated enclosure 212, the heated enclosure 212 may be removed to eject the print media from the printing device 220.

In some examples, the heated enclosure 212 aligns openings of the printing device 220 to the light path 204 of the light source 202. For examples, the heated enclosure 212 transitions openings of the heated enclosure 212 and the openings in the printing device 220 towards the light path 204 as the heated enclosure 212 is inserted in the printing device 220.

In some examples, the heated enclosure 212 aligns the light sensor 206 to the light path 204. For examples, as the heated enclosure 212 is inserted into the printing device 220 the heated enclosure 212 may position the light sensor 206 towards the light path 204. In some examples, the position of the light sensor 206 may be determined by the heated enclosure 212. For example, as the heated enclosure 212 is inserted into the printing device, the light sensor 206 may alter the position of the light sensor 206 based on the shape and positioning of the heated enclosure 212. In some examples, the position of the light sensor 206 may be based on the size of the heated enclosure 212 and/or a heat transfer belt of the heated enclosure 212.

As illustrated in FIG. 2, the printing device 220 may include a light source 202. For example, the light source 202 may be a lighting device that is able to display a light, such as, an LED, florescent light source, etc. In some examples, the light source 202 may be a light positioned above the heated enclosure 212, as illustrated in FIG. 2. In some examples, the light source 202 may be position on the first side (e.g., first side 416 as illustrated in FIG. 4) of a media pathway 208. In some examples, the light source 202 may be located above a light sensor 206 when the heated enclosure 212 is inserted in the printing device 220. In some examples, the light source 202 may be located above a light path 204, as illustrated in FIG. 2.

In some examples, the light source 202 may display a light that illuminates a path to the light sensor 206. In some examples, the light source 202 may be a constant display of light towards the light sensor 206. For example, the light source 102 may display a continuous light towards light sensor 206, during the printing process of the printing device 220. In some examples, the light source 202 may be able to withstand temperatures ranging from about 150 degrees ° C. to about 250° C.

In some examples, the light path 204 may be a path that extends from the first side a media pathway 208 to a second side (e.g., second side 414 as illustrated in FIG. 4) of a media pathway 208. For example, the light path 204 may be a path that extends from the light source 202 to the light sensor 206.

In some examples, the light sensor 206 may be positioned on the second side of a media pathway 208. In some examples, the light sensor 206 may align with the light source 202 when the heated enclosure 212 is inserted in the printing device 220. In some examples, when the heated enclosure 212 is inserted in the printing device 220, the light sensor 206 may be located below a light source 202. In some examples, the light sensor 206 may receive light from a light source 202. In some examples, the light sensor 206 may detect when it does not receive light from a light source 202. In some examples, the light sensor 206 may detect when it receives light from a light source 202. For example, the light sensor 206 may detect the amount of light received from the light source 202 to determine if print media crossed the light path 204.

In some examples, the position of the light sensor 206 may vary depending on the type of heated enclosure 212 inserted. In some examples, the light sensor 206 position may be self-locating to the heated enclosure 212. As used herein, self-locating refers to a position that is determined by another object. In some examples, when the heated enclosure 212 is removed from the printing device, the light sensor 206 may move out of alignment with the light source 202. For example, when the heated enclosure 212 is removed from the printing device 220, the light sensor 206 may transition to the left or right of the light source 202. In some examples, the light sensor 206 may be able to withstand temperature from of about 150° C. to about 250° C.

In various examples, light source may detect when print media is blocking the media pathway 208. For example, if print media crosses the light path 204, the light sensor 206 may not receive light from a light source 202 as the print media crosses the light path 204 and the light sensor 206 may determine that the print media is not lodged in the heated enclosure 212. However, if print media does not cross the light path 204, the light sensor 206 may continue to receive light from a light source 202 and the light source 206 may determine that the print media is still in the media pathway 208 and therefore, is lodge in the heated enclosure 212.

Figure 3:
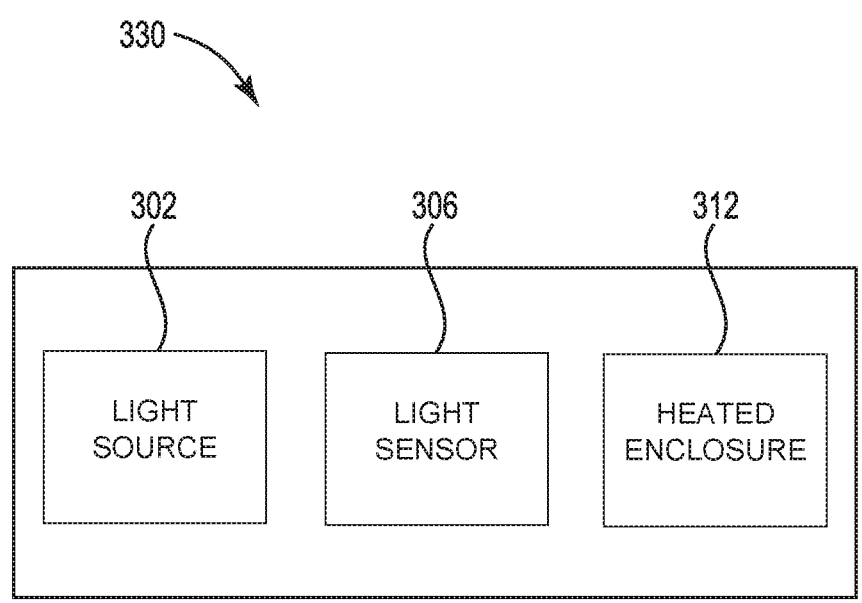
FIG. 3 illustrates an example diagram of a system for a media sensor.

FIG. 3 illustrates an example diagram of a system 330 for a media sensor. In some examples, the system 330 may include a light source 302 to display light across a light path (e.g., light path 204 as illustrated in FIG. 2). In some examples, the light source 302 may display a light that illuminates a path to the light sensor 306. For example, the light source 302 may display a light through a plurality of openings (e.g., plurality of openings 411 as illustrated in FIG. 4) of the printing device. In some examples, the light source 302 may display a light that illuminates a light path in the printing device.

In some examples, the light source 302 may be a light positioned above the heated enclosure 312. In some examples, when the heated enclosure 312 is inserted into a printing device, the light source 302 may be located above a light sensor 306. In some examples, the light source 302 may be located above a light path. In some examples, the light source 302 may be aligned with the light sensor 306.

As illustrated in FIG. 3, the system 330 may include a light sensor 306 to determine if print media is blocking the media pathway (e.g., media pathway 408 as illustrated in FIG. 4). In some examples, the light sensor 306 may align with the light source 302 when the heated enclosure 312 is inserted into a printing device. For example, the light sensor 306 may be positioned in the direct path of the light source 302. In various examples, the light sensor 306 may be connected to the light source 302 by the light displayed by the light source 302.

In some examples, the light sensor 306 may be located below a light source 302 when the heated enclosure 312 is inserted into a printing device. In some examples, the light sensor 306 may detect when light is received from a light source 302. For example, if print media does not cross the light path, the light sensor 306 will continue to receive light from a light source 302 and determine that the print media is blocking the media pathway. In some examples, the light sensor 306 may detect when print media has crossed the light path by determining when light is not received from a light source 302. For example, if print media crosses the light path, the light sensor 306 will not receive light from a light source 302 and determine that the print media is not blocking the media pathway.

In some examples, the system 330 may include a heated enclosure 312. In some examples, the heated enclosure 312 may be connected to a light path of the light source 302. For example, the heated enclosure 312 aligns the opening of the printing device with the light path of the light source 302. For examples, the heated enclosure 312 transitions openings of the heated enclosure 312 and the openings in the printing device towards the light path as the heated enclosure 312 is inserted in the printing device.

In some examples, the heated enclosure 312 may be a removable heated enclosure. In some examples, the heated enclosure 312 may be removed and replaced with a different type of heated enclosure 312. For example, the heated enclosure 312 may be removed and replaced with a heated pressure roller, a heated dryer, etc. In some examples, the heated enclosure 312 may be removed from the printing device when print media is blocking a media pathway. That is, if print media is lodged in the heated enclosure 312, the heated enclosure 312 may be removed to expel the print media from the media pathway. In some examples, portions of the media pathway may be included in the heated enclosure 312. For examples, print media may enter and exit the heated enclosure 312 to reach an output zone of the printing device.

In some examples, the heated enclosure 312 aligns the light sensor 306 to the light path of the light source 302. In some examples, as the heated enclosure 312 is inserted into the printing device, the heated enclosure 312 may position the light sensor 306 towards the light source 302. In some examples, the position of the light sensor 306 may be determined by the heated enclosure 312. For example, as the heated enclosure 312 is inserted into the printing device, the light sensor 306 may alter its position based on the position of the heated enclosure 312. In some examples, the size and/or components (e.g., heat transfer belt, alignment pin, etc.) of the heated enclosure 312 may determine the position of the light sensor 306.

FIG. 4 illustrates an example printing device 420 containing a media sensor. In some examples, the printing device 420 may include a media pathway 408 to transfer print media from an input zone of the printing device 420 to an output zone of the printing device 420. In some examples, the media pathway 408 may extend through multiple sections of the printing device 420. In some examples, the media pathway 408 may transfer print media from the heated enclosure 412 across the light path 404. For example, the media pathway 408 may be included in the heated enclosure 412.

In some examples, the heated enclosure 412 may be a removable heated enclosure. For example, the heated enclosure 412 may be removed from the printing device 420 when print media is lodged in the heated enclosure 412. In some examples, the light source 402 may turn on when the heated enclosure is removed from the printing device 420.

In some examples, the heated enclosure 412 may align the light sensor 406 to the light source 402. For examples, as the heated enclosure 412 is inserted into the printing device 420, the alignment pin 422 of the heated enclosure 412 may contact the media guide 418. In some examples, the alignment pin 422 holds the media guide 418 into position, as illustrated in FIG. 4. In some examples, the light sensor 406 may be housed in the media guide 418. In some examples, the position of the light sensor 406 is determined by the heated enclosure 412. For example, as the heated enclosure 412 is inserted, the light sensor 406 may alter its position based on the shape and positioning of the alignment pin 422 to the media guide 418.

In some examples, the heated enclosure 412 may include a heat transfer belt connected to the media pathway 408. In some examples, print media may enter the heated enclosure 412 and exit the heated enclosure 412 to reach an output zone of the printing device 420. In some examples, the distance from the first position 424 of the media pathway 408 to the second position 426 is equal to the distance from the first position 424 of the media pathway 408 to the third position 428. In some examples, print media may transition from the first position 424 of the media pathway to the second position 426. In some examples, when print media transitions to the second position 426, the light sensor 406 may determine that the print media is not lodged in the heated enclosure 412. In some examples, print media may transition from the first position 424 of the media pathway to the third position 428. In some examples, when print media transitions to the third position 426, the light sensor 406 may determine that the print media is lodged in the heated enclosure 412. In some examples, the time it takes print media to transition from the first position 424 to the second position 426 is determined by the distance between the first position 424 and the second position 426 divided by the speed of the print media. As used herein, the transition time is the time it takes print media to transition from first position to the second position.

$$\frac{\text{distance between the first position and the second position}}{\text{speed of the print media}} \quad \text{(equation 1)}$$

In some examples, the light sensor 406 may detect when print media has crossed the light path 404 by determining when light is not received from a light source 402. In some examples, if the print media crosses the light path 404 the print media may block the light source 402 from the light sensor 406. For example, if print media transitions from the first position 424 of the media pathway 408 to the second position 426, the light sensor 406 may not receive light from a light source 402 and determine that the print media is not blocking the media pathway 408. In some examples, the light sensor 406 may detect when print media has not crossed the light path 404. For example, if print media transitions from the first position 424 of the media pathway 408 to the third position 428, the light sensor 406 will continue to receive light from a light source 402 and determine that the print media may be blocking the media pathway 408. In some examples, if the light sensor 406 determines that print media is blocking the media pathway 408, the light sensor may send a signal to the printing device 420 to stop the printing process.

In some examples, the position of the light sensor 406 may vary depending on the type of heated enclosure 412 inserted. In some examples, when the heated enclosure 412 is removed from the printing device 420, the light sensor 406 may move out of alignment with the light source 402. For example, when the heated enclosure 412 is removed from the printing device 420, the alignment pin 422 of the heated enclosure 412 may move out of contact with the media guide 418, causing the light sensor 406 to transition to the left or right of the light source 402.

In various examples, the light sensor 406 may be connected to the light source 402 by the light displayed by the light source 402. In some examples, the light sensor 406 may determine if the media pathway 408 is blocked by detecting if print media has crossed the media pathway 408. In some examples, if print media does not cross the light path 404 within an expected time (e.g., a time determined consistent with equation 1), the light sensor 406 may determine that the media pathway 408 is blocked.

In some examples, the light sensor 406 may be positioned on the second side 414 of the media pathway 408. For example, the light sensor 406 may be positioned on the opposite side of the light source 402, as illustrated in FIG. 4. In some examples, the light sensor 406 may be housed in a media guide 418. In some examples, the media guide 418 may align the light sensor 406 with the light source 402 when the heated enclosure 412 is inserted in the printing device 420. In some examples, the light sensor 406 may receive light from a light source 402. For example, when the heated enclosure 412 is inserted into the printing device 420, the light path 404 may be aligned with the light sensor 406.

In some examples, the heated enclosure 412 may be connected to a light path 404 of the light source 402. In some examples, the light source 402 may display a light when the heated enclosure 412 is removed. In some examples, the heated enclosure 412 aligns openings 411 of the printing device 420 to the light path 404. For examples, the heated enclosure 412 transitions openings 411-1A and 411-1B of the heated enclosure 412 and the openings 411-2A and 411-2B in the printing device towards the light path 404 as the heated enclosure 412 is inserted in the printing device 420. For instance, openings 411-1A and 411-2A can create a first opening and openings 411-1B and 411-2B can create a second opening.

As illustrated in FIG. 4, the light source 402 may be a light positioned above the heated enclosure 421. In some examples, the light source 402 may be located above a light sensor 406, as illustrated in FIG. 4. In some examples, the light source 402 may be located on one side of the media pathway 408. For example, the light source 402 may be position on the first side 416 of a media pathway 408. In some examples, the light source 402 may be located above a light path 404.

In some examples, the light source 402 may display a light that illuminates a light path 404 to the light sensor 406. For example, when print media is being transferred through the media pathway 408 the light source 402 may display a light that is received by the light sensor 406. In some examples, the light source 402 may be a constant display of light through a light path 404. For example, the light source 402 may display a continuous light through the light path 404 during the printing process of a printing device 420.

In some examples, the printing device 420 may include a processing resource and a memory resource. The processing resource may be a hardware processing unit such as a microprocessor, application specific instruction set processor, coprocessor, network processor, or similar hardware circuitry that may cause machine-readable instructions to be executed. In some examples, the processing resource may be a plurality of hardware processing units that may cause machine-readable instructions to be executed. The processing resource may include central processing units (CPUs) among other types of processing units. The memory resource may be any type of volatile or non-volatile memory or storage, such as random access memory (RAM), flash memory, read-only memory (ROM), storage volumes, a hard disk, or a combination thereof.

The memory resource may store instructions thereon. When executed by the processing resource, the instructions may cause the printing device 420 to perform specific tasks and/or functions. For example, the memory resource may store instructions which may be executed by the processing resource to cause the printing device 420 to determine when a media pathway is blocked. In some examples, if print media is lodge inside the heated enclosure 412, the printing device 420 may be unable to function. The memory resource may store instructions which may be executed by the processing resource to cause the light sensor 406 to send a signal to stop the printing process, if it is determined that the media pathway 408 is blocked. In some examples, if print media is lodged in the heated enclosure 412, the printing device 420 may stop the printing process to allow for removal of the print media.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

It should be understood that when an element is referred to as being "on," "in contact," "connected to", "coupled to", or "coupled with" another element, it may be directly on, in contact, connected, or coupled with the other element or intervening elements may be present. In contrast, when an object is "directly coupled to" or "directly coupled with" another element it is understood that are no intervening elements (adhesives, screws, other elements) etc.

It should be understood that when an element is referred to as being "adjacent" to another element, it may be on, in contact, connected, next to, or coupled with the other element.

It should be understood that the descriptions of various examples may not be drawn to scale and thus, the descriptions may have a different size and/or configuration other than as shown therein.

While some elements are designated as a "top" or a "bottom" and/or "front" or "back," it should be understood that such elements may correspond to other relative terms or possible orientations in some applications in order to practice the examples of this disclosure.

What is claimed:

1. A media sensor device comprising:
   a light source positioned on a first side of a media pathway;
   a light path to receive a light from the light source and direct the light through a plurality of openings from the first side of the media pathway to a second side of the media pathway; and
   a light sensor, parallel to the light source, on the second side of the media pathway to detect print media within the light path based on an intensity of light received from the light source, wherein a heated enclosure, including a heat source, aligns the light sensor with the light path by contacting and positioning a media guide housing the light sensor.

2. The media sensor device of claim 1, wherein the heated enclosure is a removable heated enclosure, wherein the heated enclosure is to transition the light sensor towards the light path to align the light sensor with the light path.

3. The media sensor device of claim 2, wherein the removable heated enclosure is to position the plurality of openings towards the light path to align the plurality of openings with the light path.

4. The media sensor device of claim 1, wherein the light source is a light emitted diode (LED).

5. The media sensor device of claim 1, wherein the sensor is an ambient light sensor.

6. The media sensor device of claim 1, wherein the light source is located above the heated enclosure.

7. A printing device comprising:
   a media pathway;
   a removable heated enclosure, including a heat source, to align a light sensor with a light path by contacting and positioning a media guide housing the light sensor; and
   a media sensor device including:
      a light source to illuminate the light path in the printing device; and
      the light sensor, parallel to the light source, to detect print media within the light path based on an intensity of light received from the light source.

8. The printing device of claim 7, wherein the light sensor is to detect a blocked media pathway.

9. The printing device of claim 8, wherein in response to detection of the blocked media pathway, a print process is to be stopped.

10. The printing device of claim 7, wherein the light sensor is to send a signal to the printing device to stop a print process, in response to a determination that print media does not cross the light path within an expected time.

11. A system for a media sensor device comprising:
    a light source in alignment with a light sensor, wherein the light source is on a first side of a media pathway and wherein the light source is to illuminate a light path in a printing device;
    the light sensor on a second side of the media pathway to detect light from the light path and determine if a print media is within the light path; and a removable heated enclosure, including a heat source, connected to the light sensor, wherein the removable heated enclosure is to position the light sensor towards the light path to align the light sensor with the light path by contacting and positioning a media guide housing the light sensor.

12. The system of claim 11, wherein the light path is to cross the media pathway.

13. The system of claim 12, wherein the print media is to enter the removable heated enclosure before the print media is to cross the light path.

14. The system of claim 12, wherein the media pathway includes the removable heated enclosure and is to cross the light path.

15. The system of claim 11, wherein the removable heated enclosure is to be removed in response to a blocked media pathway.

\* \* \* \* \*